(12) United States Patent
Rane et al.

(10) Patent No.: US 11,038,723 B2
(45) Date of Patent: Jun. 15, 2021

(54) BI-LEVEL ADAPTIVE EQUALIZER

(71) Applicant: TEXAS INSTRUMENTS INCORPORATED, Dallas, TX (US)

(72) Inventors: Amit Rane, Santa Clara, CA (US); Charles Michael Campbell, Wylie, TX (US); Suzanne Mary Vining, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/778,955

(22) Filed: Jan. 31, 2020

(65) Prior Publication Data

US 2021/0075650 A1    Mar. 11, 2021

Related U.S. Application Data (60) Provisional application No. 62/898,024, filed on Sep. 10, 2019.

(51) Int. Cl.
*H04L 25/03* (2006.01)
*H04L 7/00* (2006.01)
*G11B 20/10* (2006.01)

(52) U.S. Cl.
CPC ...... *H04L 25/03057* (2013.01); *H04L 7/0058* (2013.01); *H04L 7/0087* (2013.01);
(Continued)

(58) Field of Classification Search
CPC ........ G11B 20/10046; G11B 20/10222; H04L 2025/03745; H04L 25/03949
(Continued)

(56) References Cited

U.S. PATENT DOCUMENTS

| 6,956,914 B2 | 10/2005 | Sivadas et al. |
| 8,270,463 B1 | 9/2012 | Rane et al. |
| (Continued) | | |

FOREIGN PATENT DOCUMENTS

| EP | 2107746 | 10/2009 |
| GB | 2135856 | 11/1986 |

OTHER PUBLICATIONS

International Search Report in corresponding PCT Application No. PCT/2020/049641, dated Nov. 26, 2020 (2 pages).

*Primary Examiner* — Leila Malek
(74) *Attorney, Agent, or Firm* — John R. Pessetto; Charles A. Brill; Frank D. Cimino (57) ABSTRACT

At least some aspects of the present disclosure provide for a method. In at least one example, the method includes applying first equalization to a received data signal to generate an equalizer signal and comparing the equalized signal to each of a plurality of reference voltages for a predetermined period of time per respective reference voltage to generate a comparison result. The method further includes determining a plurality of counts with each count of the plurality of counts uniquely corresponding to a number of rising edges in the comparison result for each of the plurality of reference voltages. The method further includes comparing at least one of the plurality of counts to at least another of the plurality of counts to determine a relationship among the plurality of counts and applying second equalization to the received data signal based on the determined relationship among the plurality of counts.

17 Claims, 4 Drawing Sheets

(52) U.S. Cl.
CPC .. *G11B 20/10046* (2013.01); *G11B 20/10222* (2013.01); *H04L 2025/03745* (2013.01)

(58) Field of Classification Search
USPC .......................................................... 375/232
See application file for complete search history.

(56) References Cited

U.S. PATENT DOCUMENTS

| | | |
|---|---|---|
| 9,674,010 B2 | 6/2017 | Li |
| 10,138,577 B2 | 11/2018 | Katsuta et al. |
| 2005/0181741 A1 | 8/2005 | Raj |
| 2018/0191534 A1* | 7/2018 | Rane ................. H04L 25/03038 |

\* cited by examiner

BI-LEVEL ADAPTIVE EQUALIZER

CROSS-REFERENCE TO RELATED APPLICATIONS

The present application claims priority to U.S. Provisional Patent Application No. 62/898,024, which was filed Sep. 10, 2019, is titled "Dynamic Bi-Level Adaptive Receiver Equalizer for USB3.2," and is hereby incorporated herein by reference in its entirety.

SUMMARY

At least some aspects of the present disclosure provide for a circuit. In at least some examples, the circuit comprises an equalizer, a comparator, a counter, and a controller. The equalizer comprises an input terminal configured to receive a data signal and an output terminal. The equalizer is configured to receive an equalizer setting and generate an equalized signal according to the data signal and the equalizer setting. The comparator comprises a first input terminal coupled to the output terminal of the equalizer, a second input terminal configured to receive a plurality of threshold signals, and an output terminal at which the comparator is configured to output a comparison result indicating a result of a comparison between the equalized signal and a respective threshold signal of the plurality of threshold signals under current consideration. The counter comprises an input terminal and an output terminal and being configured to count a number of rising edges of the comparison result. The controller comprises an input terminal coupled to the output terminal of the comparator and an output terminal coupled to a control input of the equalizer. The controller is configured to control the equalizer to apply a short conductor equalizer setting, determine a relationship among counts output by the counter for multiple of the plurality of threshold signals, and control the equalizer to remain at the short conductor equalizer setting or control the equalizer to apply a long conductor equalizer setting based on the determined relationship.

Other aspects of the present disclosure provide for a system. In at least some examples, the system includes a processor, a non-transitory memory, and an equalization adaptation computer program product stored in the non-transitory memory. When executed by the processor, the equalization adaptation computer program product causes the processor to control an equalizer to apply first equalization to a received data signal to generate an equalized signal, control a digital-to-analog converter (DAC) to output a plurality of threshold signals for comparison to the equalized signal, determine a count of rising edges in a comparison result of the comparison of the equalized signal to the threshold signal for a predetermined period of time for each of the plurality of threshold signals, determine a relationship among multiple of the determined counts of rising edges, and control the equalizer to apply second equalization to the received signal according to the determined relationship.

Other aspects of the present disclosure provide for a method. In at least one examples, the method includes applying first equalization to a received data signal to generate an equalizer signal and comparing the equalized signal to each of a plurality of reference voltages for a predetermined period of time per respective reference voltage to generate a comparison result. The method further includes determining a plurality of counts with each count of the plurality of counts uniquely corresponding to a number of rising edges in the comparison result for each of the plurality of reference voltages. The method further includes comparing at least one of the plurality of counts to at least another of the plurality of counts to determine a relationship among the plurality of counts and applying second equalization to the received data signal based on the determined relationship among the plurality of counts.

BRIEF DESCRIPTION OF THE DRAWINGS

For a detailed description of various examples, reference will now be made to the accompanying drawings in which.

DETAILED DESCRIPTION

At least some communication systems are exposed to the outside world through a receptacle. The receptacle is configured to receive a plug to, in some examples, enable data transmission. One example of such a communication system is a Universal Serial Bus (USB) system in which a USB receptacle is configured to receive a USB plug to enable communication. The USB plug is coupled to conductors that are coupled to a processor, memory, or other circuitry. In some examples, the conductors are short. For example, a USB thumb drive or memory stick that does not include a cable is considered to be a short conductor. Conversely, a USB cable between the plug and the other circuitry is considered a long conductor. More generally, in some implementations the short and long conductors are defined according to signal loss that occurs on the conductor, such as in a scale of decibels (dB) where a short conductor has losses less than a certain threshold and a long conductor has losses greater than a certain threshold. In at least some implementations of a USB system, the short conductor has losses of about 2.2 dB when operating at 5 gigahertz (GHz) and the long conductor has losses of about 15 dB when operating at 5 GHz.

Because a length of the conductor is not necessarily known to the system prior to the plug being inserted into the receptacle, the system should be capable of supporting both the long and short conductors. However, enabling support for both the long and short conductors often involves tradeoffs. Some available solutions such as the use of a retimer circuit impart added cost in area consumed by a circuit, a component count of the circuit, power consumed by the circuit, etc. Another solution is a redriver circuit that supports both long and short conductors via a single redriver setting. However, tradeoffs again occur. For example, when optimized for supporting the long conductor, the system is not optimized for supporting the short conductor, and vice versa. Therefore, often only partial optimization is used that is suitable for both long and short conductors but is results in optimal performance via neither the long nor the short conductor. Accordingly, in at least some systems a circuit suitable for supporting both long and short conductors is desirable.

At least some aspects of the present disclosure provide for dynamic bi-level adaptation of equalization in a communication system. The equalization compensates for effects of conductors (e.g., a long conductor or a short conductor) on performance of the communication system. The adaptation is dynamic in that it is performed based on a determination at a time of link training of whether the conductor is a long conductor or a short conductor. The adaptation is further bi-level because it selects between a predetermined equalization setting for a long conductor and a predetermined equalization setting for a short conductor rather than selecting among many different equalization settings. At least partially because of the bi-level nature of the adaptation, the adaptation is determined and applied more rapidly than other approaches, such as the retimer discussed above.

Figure 1:
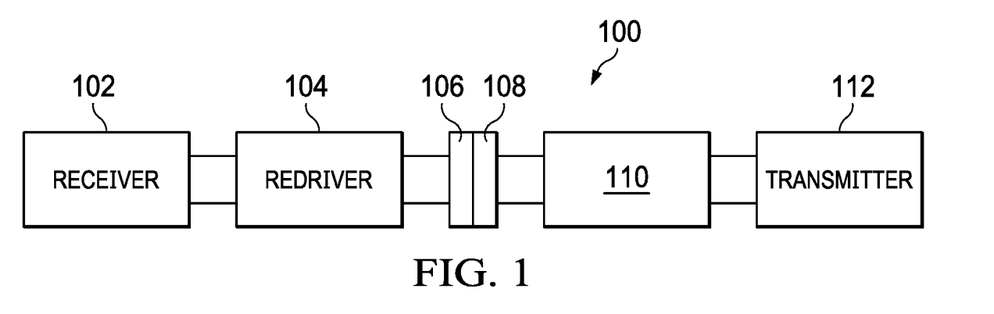
FIG. 1 shows a block diagram of an illustrative communication system in accordance with various examples.

Turning now to FIG. 1, a block diagram of an illustrative communication system 100 is shown. In at least some examples, the system 100 is representative of a USB system. In other examples, the system 100 is representative of another type of communication system. For example, in at least one implementation the system 100 is representative of a Peripheral Component Interconnect Express (PCI express) system. In at least some implementations, the system 100 includes a receiver 102, a redriver 104, a receptacle 106, a plug 108, a conductor 110, and a transmitter 112. In at least some examples, the system 100 includes further components not illustrated in FIG. 1, such as alternating current (AC) decoupling capacitors, electromagnetic static discharge (ESD) protection components, etc.

In at least one example architecture, the receiver 102 is coupled to the redriver 104 and the redriver 104 is coupled to the receptacle 106. In at least some examples, the couplings are differential signal lines, while in other examples the couplings are single-ended signal lines. Although two couplings are illustrated in FIG. 1, in various implementations, any number of suitable couplings are present. The receptacle is configured to couple to the plug 108, which is coupled to the conductor 110. The conductor 110 is configured to couple to the transmitter 112. In some examples, the coupling between the conductor 110 and the transmitter 112 is performed through another plug and receptacle, while in other examples the conductor is coupled to the transmitter 112 in another manner, such as soldering, etc. In some examples, the conductor 110 is a short conductor, as described above. In other examples, the conductor 110 is a long conductor, also as described above.

In an example of operation of the system 100, the transmitter 112 transmits data to the receiver 102. The transmitted data flows from the transmitter 112 through the conductor 110, plug 108, receptacle 106, and redriver 104 to the receiver 102. In at least some examples, signal loss occurs in a signal path between the transmitter 112 and the redriver 104. The signal loss, in some examples, varies based on characteristics of the conductor 110 (e.g., such as whether the conductor 110 is long or short). To compensate for the signal loss, in at least some examples, the redriver 104 boosts a value of the signal. For example, the redriver 104 includes an equalizer (not shown) that equalizes (e.g., boosts or amplifies) the signal prior to transmitting the signal to the receiver 102. In at least some examples, the equalizer is linear in operation to preserve other characteristics of the signal received from the transmitter 112.

The equalization applied by the equalizer, in some examples, is dependent on the conductor 110. For example, when the conductor 110 is a short conductor, less (or no) equalization is applied and when the conductor 110 is a long conductor, a greater amount of equalization is applied. However, in most circumstances the redriver 104 does not have prior knowledge of the length of the conductor 110. To provide equalization optimized for a short conductor when the conductor 110 is a short conductor and equalization optimized for a long conductor when the conductor 110 is a long conductor, in at least some examples, the redriver 104 determines a state of the conductor 110 as long or short after the plug 108 is inserted into the receptacle 106. In at least some implementations, such as when the system 100 is a USB system, the determination is made during a link training process or period of time. Because, in at least some implementations, other functions are also performed during the link training process, it is sometimes desirable or advantageous for the determination of the conductor 110 as being long or short to be made in a shortest possible amount of time.

To determine whether the conductor 110 is short or long, in at least some examples, the equalizer is set to a predetermined short conductor equalization setting and a resulting equalized signal is compared to a plurality of thresholds. A count is maintained for each of the thresholds indicating a number of times that the equalized signal exceeded the threshold. When the count at one or more of the thresholds is much less than the count at another threshold, in at least some examples, the conductor 110 is determined to be a long conductor. For example, when the count at the one or more of the thresholds varies by at least 3.5% from the count at the another threshold, in some examples, the conductor 110 is determined to be a long conductor. In other examples, the allowable variation is programmable between a range of percentages, such as about 3.1% to about 3.7%. The allowable variation is selected, in some examples, at least partially based on noise levels in the system 100. Conversely, when the count at one or more of the thresholds is approximately equal (e.g., within a predefined percentage of variation, such as about 3.5%) to the count at another threshold, in at least some examples, the conductor 110 is determined to be a short conductor. For both the long conductor and short conductor determinations, in at least some examples, at least one of the one or more threshold is lesser in value than the another threshold and at least one of the one or more threshold is greater in value than the another threshold.

After determining whether the conductor 110 is a long or short conductor, in at least some examples, the redriver 104 applies equalization to the signal received from the transmitter 112 to generate the equalized signal. The equalization that is applied, in at least some examples, is a predetermined value selected from a long conductor setting and a short conductor setting. If the conductor 110 is a short conductor, the equalization applied by the redriver 104 remains unchanged because its equalization was already set to short for the determination of the length of the conductor 110. If the conductor 110 is a long conductor, the redriver 104 changes to a predetermined amount of equalization for a long conductor. Because only two settings exist for equalization, short equalization or long equalization, in at least some examples, the equalization is considered bi-level. The bi-level equalization, in at least some examples, is determined and applied in less than one millisecond, less than 500 microseconds, less than 200 microseconds, less than about 100 microseconds, or less than about 50 microseconds. The speed of determination and application of the bi-level equalization, in at least some examples, is an improvement over other equalization approaches, such as those employed be a retimer or a redriver that compares equalized signals for multiple equalization settings to threshold signals or performs redriver adaptation according to energy based adaptation methods.

Figure 2:
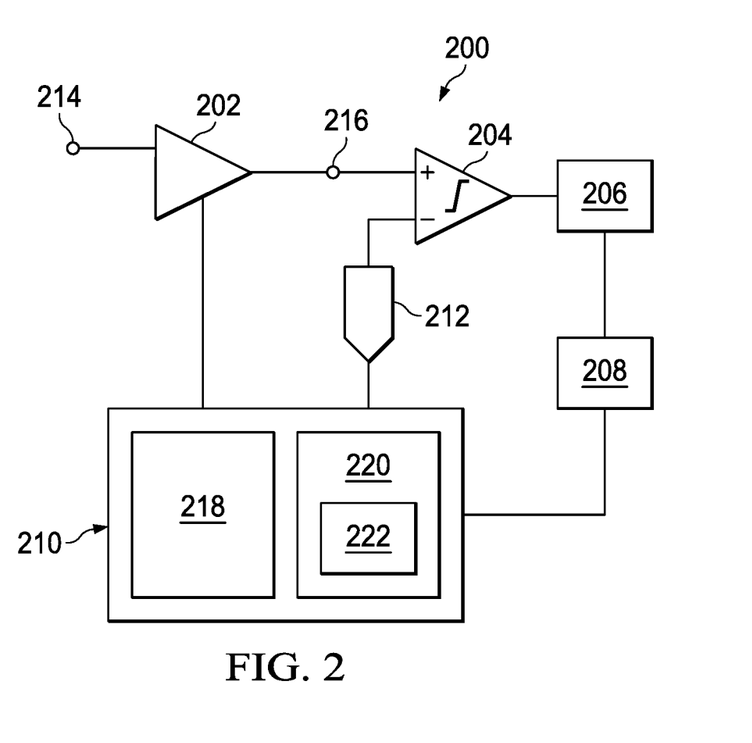
FIG. 2 shows a schematic diagram of an illustrative redriver in accordance with various examples.

Turning now to FIG. 2, a block diagram of an illustrative redriver 200 is shown. In at least some examples, the redriver 200 is suitable for implementation as the redriver 104 of the system 100 of FIG. 1. Therefore, reference is made to at least some components and/or signals of the system 100 in describing the redriver 200. However, the redriver 200 is also suitable for implementation in systems, other than the system 100, in which functionality of the redriver 200 is desirable and/or advantageous.

In at least some examples, the redriver 200 includes an equalizer 202, a comparator 204, a divider 206, a counter 208, a controller 210, and a digital-to-analog converter (DAC) 212. In at least some examples, the equalizer 202 is a continuous time linear equalizer (CTLE). In other examples, the equalizer 202 is a decision feedback equalizer (DFE), a feed-forward equalizer (FFE), or any other suitable form of equalizer that does not rely or utilize a recovered clock signal (e.g., via clock data recovery) to perform equalization.

In at least one implementation, the equalizer 202 has a data input terminal coupled to a node 214, a control input terminal, and an output terminal coupled to a node 216. The comparator 204 has a first input terminal (e.g., a positive or non-inverting input terminal) coupled to the node 216, a second input terminal (e.g., a negative or inverting input terminal), and an output terminal. The divider 206 has an input terminal coupled to the output terminal of the comparator 204 and an output terminal. The counter 208 has an input terminal coupled to the output terminal of the divider 206 and an output terminal coupled to an input terminal of the controller 210. The controller 210 has a first output terminal coupled to an input terminal of the DAC 212 which has an output terminal coupled to the second input terminal of the comparator 204. The controller 210 further has a second output terminal coupled to the control input terminal of the equalizer 202.

While illustrated as a single terminal and coupling between the controller 210 and the DAC 212, as well as between the controller 210 and the equalizer 202, in at least some examples multiple terminals and couplings exist such that multiple data bits are provided to the equalizer 202 and the DAC 212 from the controller 210. For example, in at least some examples, the controller 210 transmits 4 bits of data to the DAC 212 and transmits another 4 bits of data to the equalizer 202. In other examples, any suitable number of bits are transmitted to the equalizer 202 and the DAC 212, in at least some examples, based, respectively, on a maximum number of equalization settings of the equalizer 202 and a number of thresholds for comparison by the comparator 204. While illustrated as being separate from the controller 210, in at least some examples, the counter 208 is instead a component of the controller 210, for example, such that the counter 208 is implemented in software executed by the controller 210. Additionally, in at least some examples, the redriver 200 includes further components not shown in FIG. 2, such as a driver having an input coupled to the node 214 and an output configured to provide an output signal of the redriver 200.

In at least some examples, the controller 210 includes a processor 218 and a memory 220. In at least some examples, the processor 218 is a micro controller or other microprocessing unit. Stored within the memory 220, in at least some examples, is an equalization adaptation computer program product 222. In at least some implementations, the processor 218 executes the equalization adaptation computer program product 222 to cause generation of an equalized signal, as described herein. For example, in at least some implementations, executing or otherwise implementing the equalization adaptation computer program product 222 causes the processor 218 to implement an adaptation finite state machine. The adaptation finite state machine, in at least some examples, determines whether a conductor (such as the conductor 110) coupled to the node 214 is a long conductor or a short conductor and generates control signals for controlling the equalizer 202 to perform equalization according to that determination.

In an example of operation of the redriver 200, a signal is received at the node 214. The signal is received, in at least some examples, via a conductor such as the conductor 110 that is either a short conductor or a long conductor, as defined elsewhere herein. The equalizer 202 applies equalization to the received signal to generate and output an equalized signal. The equalization is applied, in at least some examples, based on an equalization setting received from the controller 210. When the redriver 200 has already determined the equalization to apply to the received signal (e.g., long or short equalization) to generate the equalized signal (e.g., adaptation has already occurred), in at least some examples, the comparator 204, divider 206, counter 208, and/or DAC 212 are disabled to prevent unnecessary power consumption.

The following discussion of the redriver 200 is made with reference to the redriver 200 while performing the adaptation of the equalization. In at least some examples, the controller 210 begins the adaptation by controlling the equalizer 202 to provide a predetermined amount of equalization configured for a short conductor. In some examples, the predetermined equalization for the short conductor is a lowest, or no, amount of equalization. In other examples, the predetermined equalization for the short conductor is a nonzero amount of equalization that is less than a predetermined equalization for a long conductor. While the equalizer 202 is providing the predetermined equalization for the short conductor, the controller 210 controls the DAC 212 to generate and output a plurality of threshold signals in a stair-stepped manned from zero to a value greater than zero. In at least some examples, this results in generation of about 16 threshold signals. In some examples, the threshold signals have a resolution of about 40 millivolts (e.g., each subsequent threshold signal is about 40 millivolts greater in value than an immediately preceding threshold signal). In some examples, the threshold signals represent a result of a sweep from a minimum supported output value for the DAC 212 to a maximum supported output value of the DAC 212 based on a number of data bits received from the controller 210.

In at least some other examples, the controller 210 controls the DAC 212 to generate and output a different plurality of threshold signals. For example, the controller 210 controls the DAC 212 to generate and output threshold signals having three specific values of interest (e.g., such as hits [neg], hits[pos], and hits[0], discussed in greater detail below). Controlling the DAC 212 to generate and output only the threshold signals at the specific values of interest, in at least some examples, results in a more rapid determination of a conductor as long or short and prevents unnecessary consumption of power generating and outputting threshold signals not of interest.

The comparator 204 outputs a comparison result for each threshold signal indicating whether or not the equalized signal exceeds the respective threshold signal. In at least some examples, the controller 210 controls the DAC 212 to output a same threshold signal for a predetermined period of time such that multiple comparisons of the equalized signal are made to each threshold signal. In at least one example, the predetermined period of time is about 3 microseconds. In other examples, the predetermined period of time is programmable, such as to a maximum value of about 12 microseconds. More generally, in at least some examples, a value of the predetermined period of time is determined at least partially according to a pattern type of a signal received at the node 214, a data rate of the signal received at the node 214, a maximum allowable adaptation time, etc. Performing multiple comparisons of the equalized signal to each threshold signal, in at least some examples, mitigates an opportunity for variation in the equalized signal to influence the adaptation process.

In at least some examples, the equalized signal has a frequency in a GHz range, such as about 5 GHz, which, in some examples, creates difficulty or unnecessary challenge or expense in accurate counting. This frequency is translated to the output of the comparator 204. Accordingly, the divider 206 divides the comparator output to generate a divided signal. In at least some examples, the divider 206 is a frequency divider that divides the comparator output by eight to generate a signal in a megahertz (MHz) range, such as a signal of about 625 MHz when the comparator output had a frequency of 5 GHz. In other examples, the divider 206 divides the comparator output according to any suitable integer based on an application environment of the redriver 200 and/or technical limitations of the counter 208.

For each threshold signal, the processor 218 resets the counter 208. Accordingly, the counter 208 begins a count at zero and increments the count for each received rising edge in the divided signal, indicating that the equalized signal has exceeded a value of the respective threshold signal under consideration at that time. The processor 218 receives the count from the counter 208 for comparisons to each threshold signal and stores each count, such as in the memory 220 or another storage device (not shown) such as a cache or register. In at least some examples, the processor 218 further stores a value of the threshold signal that corresponds to each respective count.

After determining a count for comparison of the equalized signal to each threshold signal, the processor 218 compares a plurality of the previously stored counts. For example, the processor 218 determines a number of counts occurring at a plurality of threshold signal values and compares them to determine a relationship among them. In at least some examples, the processor 218 determines a value hits[neg] to equal the count at a threshold signal value of about 3. In those examples, the processor 218 further determines a value hits[pos] to equal the count at a threshold signal value of about 12. Also in those examples, the processor 218 further determines a value hits[0] to equal the count at a threshold signal value of about 7. In some examples, the value of hits[pos] and hits[neg] varies from the above values if the input signal received at the node 214 has unequal rising and falling edge transitions. More generally, when hits[0] corresponds to a threshold signal value of X and hits[neg] corresponds to a threshold signal value of X-Y, hits[pos] corresponds to a threshold signal value of X+(Y+1). Furthermore, hits[0] is determined to be approximately equal to a DAC output value of about 7 when the DAC output value is programmable between about 0 and about 15. When hits[0] is approximately equal in value to both hits[neg] and hits[pos], the processor 218 determines that the conductor coupled to the node 214 is a short conductor. When hits[0] is much greater in value that either hits[neg] or hits[pos], the controller 210 determines that the conductor coupled to the node 214 is a long conductor. In at least some implementations, an error condition (such as a conductor short) is recorded if hits[0] is determined to be less than hits[neg] or hits[pos].

Based on the determination of long or short conductor based on a relationship among hits[neg], hits[pos], and hits[0], the processor 218 provides a predetermined equalization setting to equalizer 202. The predetermined equalization setting is provided to the equalizer 202, in at least some examples, within approximately 100 microseconds of the redriver 200 beginning the equalization adaptation. In at least some examples, the equalization adaptation is further dynamically provided to the equalizer 202 because it is provided after the conductor is coupled to the node 214 and based on the determined length of the conductor. When the determination is made that the conductor 110 is a short conductor, the processor 218 takes no further action with respect to the predetermined equalization setting because the equalizer 202 has already been previously programmed with the predetermined equalization for the short conductor. When the determination is made that the conductor 110 is a long conductor, the processor 218 selects a predetermined equalization setting a long conductor and outputs that setting to the equalizer 202.

In at least some examples, after providing the predetermined equalization setting to the equalizer 202, the processor 218 disables at least some of the comparator 204, divider 206, counter 208, and/or DAC 212 to prevent unnecessary power consumption. When a new coupling is detected at the node 214, the processor 218 enables the comparator 204, divider 206, counter 208, and DAC 212 and again performs the equalization adaptation of the present disclosure for the newly coupled conductor.

Figure 3:
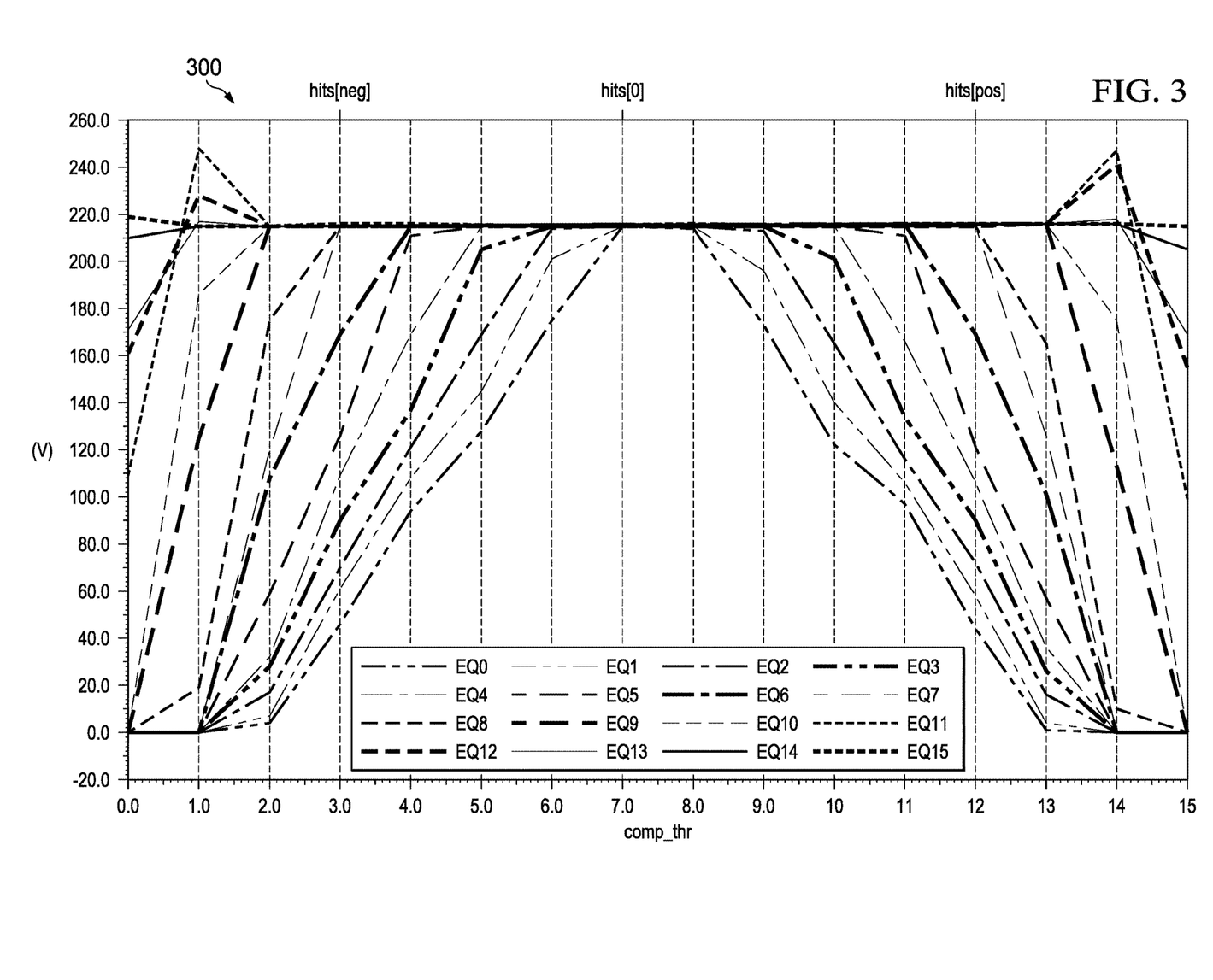
FIG. 3 shows an illustrative diagram of signal waveforms in accordance with various examples.

Turning now to FIG. 3, an illustrative diagram 300 of signal waveforms is shown. In at least some examples, the diagram 300 is representative of at least some signals present in the redriver 200 of FIG. 2 when a conductor coupled to the node 214, also of FIG. 2, is a long conductor. Accordingly, reference is made to at least some components and/or signals of FIG. 2 in describing the diagram 300. A y-axis of the diagram 300 represents a number of counts made by the counter 208 and an x-axis of the diagram 300 represents the values of the threshold signals, from a minimum value output by the DAC 212 in the sweep of the threshold signals to a maximum value output by the DAC 212 in the sweep of the threshold signals. Further illustrated on the x-axis of the diagram 300 are threshold signal values corresponding to hits[neg], hits[pos], and hits[0] in one implementation of the present disclosure.

Each signal illustrated in the diagram 300 uniquely corresponds to one equalization setting of the equalizer 202 for a received signal from a conductor under test, for a sweep of each of the plurality of threshold signals, as described above. As shown by the diagram 300, both a count occurring at the value of hits[neg] and a count occurring at the value of hits[pos] are much less than a count occurring at the value of hits[0]. Accordingly, this relationship illustrated in the diagram 300 between hits[neg], hits[pos], and hits[0] indicates that the conductor under test is a long conductor.

Figure 4:
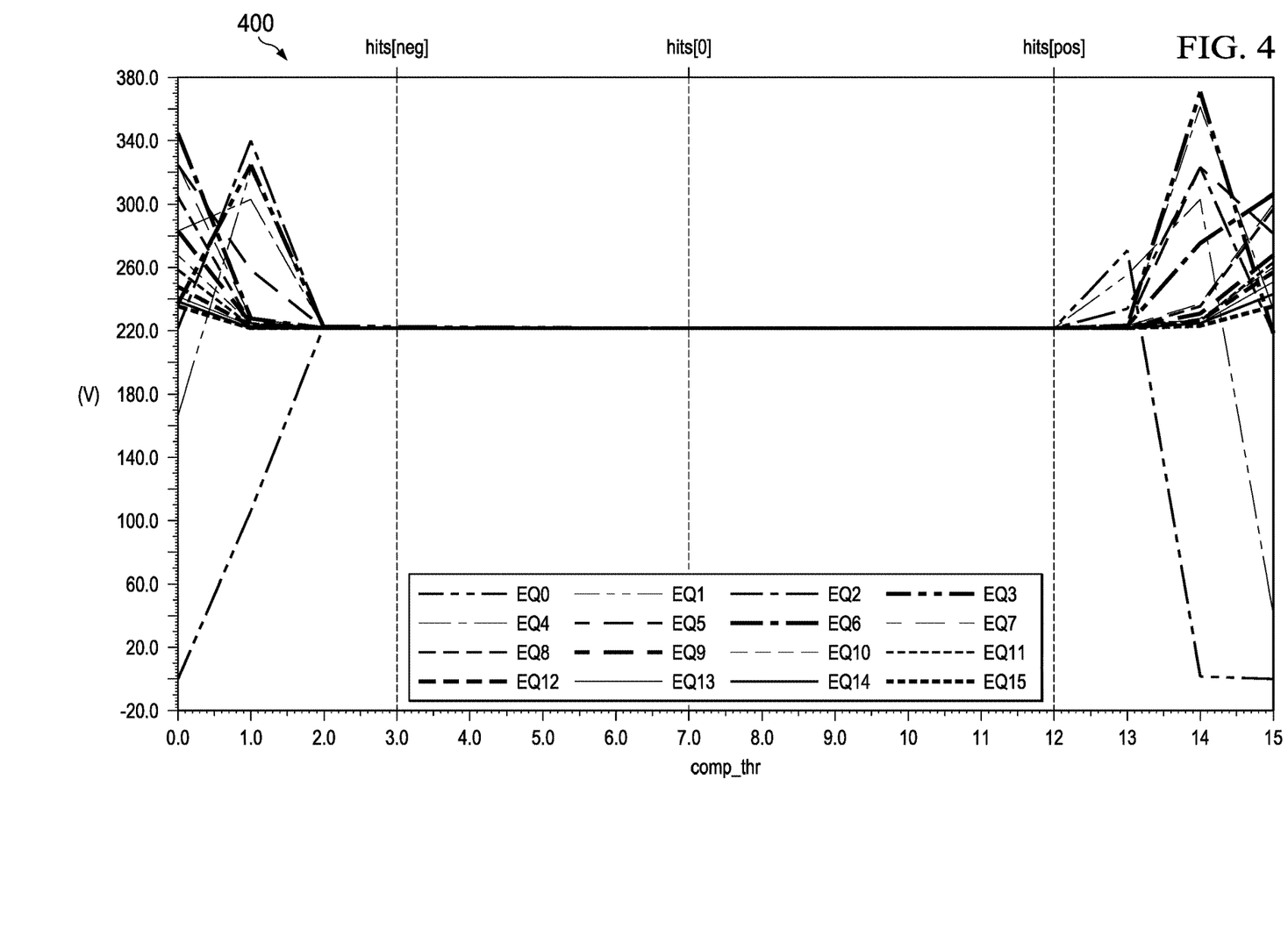
FIG. 4 shows an illustrative diagram of signal waveforms in accordance with various examples.

Turning now to FIG. 4, an illustrative diagram 400 of signal waveforms is shown. In at least some examples, the diagram 400 is representative of at least some signals present in the redriver 200 of FIG. 2 when a conductor coupled to the node 214, also of FIG. 2, is a short conductor. Accordingly, reference is made to at least some components and/or signals of FIG. 2 in describing the diagram 400. A y-axis of the diagram 400 represents a number of counts made by the counter 208 and an x-axis of the diagram 400 represents the values of the threshold signals, from a minimum value output by the DAC 212 in the sweep of the threshold signals to a maximum value output by the DAC 212 in the sweep of the threshold signals. Further illustrated on the x-axis of the diagram 400 are threshold signal values corresponding to hits[neg], hits[pos], and hits[0] in one implementation of the present disclosure.

Each signal illustrated in the diagram 400 uniquely corresponds to one equalization setting of the equalizer 202 for a received signal from a conductor under test, for a sweep of each of the plurality of threshold signals, as described above. As shown by the diagram 400, both a count occurring at the value of hits[neg] and a count occurring at the value of hits[pos] are approximately equal to a count occurring at the value of hits[0]. Accordingly, this relationship illustrated in the diagram 400 between hits[neg], hits[pos], and hits[0] indicates that the conductor under test is a short conductor.

Figure 5:
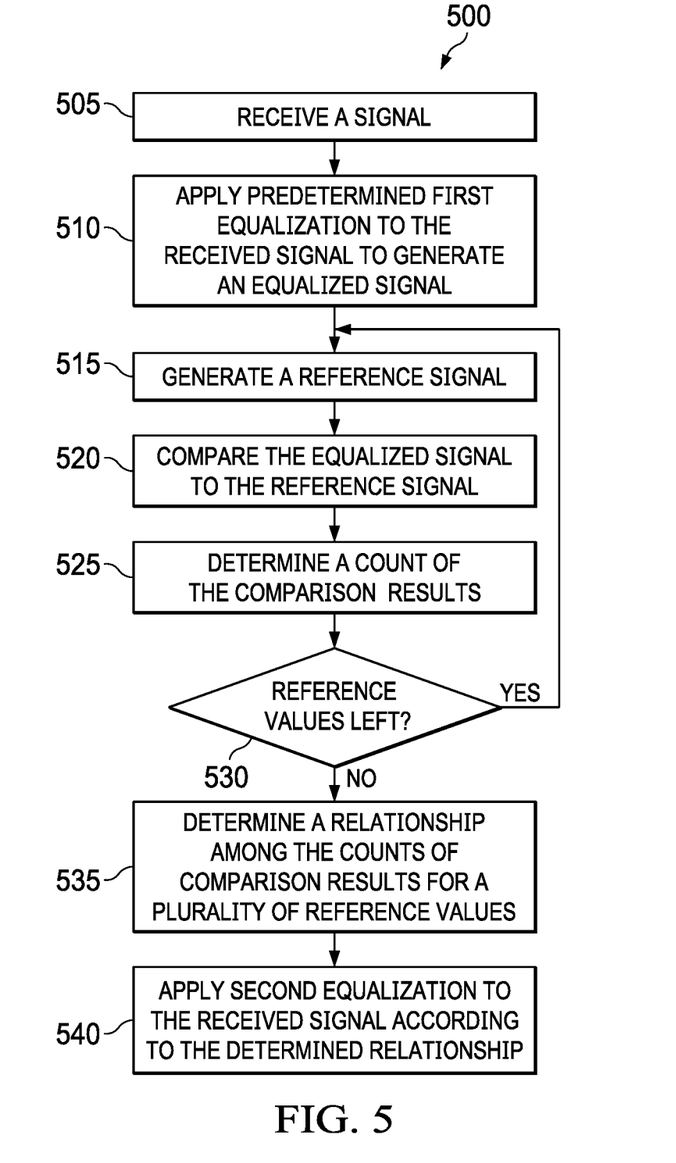
FIG. 5 shows a flowchart of an illustrative method in accordance with various examples.

Turning now to FIG. 5, a flowchart of an illustrative method 500 is shown. In at least some examples, the method 500 is a method of dynamic bi-level adaptation of equalization in a system, such as a communication system. The method 500 is implemented, in at least some examples, by a controller such as the controller 210 of FIG. 2 and reference is made to one or more of the preceding figures in describing the method 500. In at least some examples, the method 500 is implemented or executed by executing the equalization adaptation computer program product 222 of FIG. 2. Further, in at least some examples, the operations of the method 500 are also, or alternatively, representative of states of a state machine, such as the adaptation finite state machine, discussed above.

At operation 505, a signal is received. In at least some examples, the signal is a signal complying with USB protocols and is received via a conductor of unknown length that is classified as either short or long based on characteristics of the conductor. In other examples, the signal complies with any other suitable, or no, signal or communication protocol.

At operation 510, predetermined first equalization is applied to the received signal to generate an equalized signal. In at least some examples, the first equalization is equalization for a short conductor. The equalization is performed, in some examples, by an equalizer based on an equalization setting received from a controller.

At operation 515, a reference voltage is generated. In some examples, the reference voltage is generated by a controller outputting a reference value to a DAC to cause the DAC to generate the reference voltage. In other examples, the reference voltage is output by the controller directly. In yet other examples, the reference voltage is generated by, or received from, any suitable component.

At operation 520, the equalized signal is compared to the reference voltage. The equalized signal is compared to the reference voltage to determined, in at least one implementation, whether a value of the equalized signal exceeds a value of the reference voltage at a particular point in time at which the comparison is performed. Accordingly, in this regard, the reference voltage is sometimes referred to as a threshold signal. The comparison results in a comparison result. In at least some examples, the comparison is performed a plurality of times such that multiple comparison results are generated with respect to the same reference voltage and the equalized signal at multiple points in time.

At operation 525, a count of the comparison results is determined. The count is made, in at least some examples, by a hardware or software implementation of a counter counting a number of asserted pulses being output by a comparator. In at least some examples, the comparison result is first divided (e.g., such as by a frequency divider) prior to counting. The dividing is performed, in some examples, when the comparison result is at a frequency that makes counting difficult or unable to be performed accurately.

At operation 530, a determination is made whether reference voltages remain to be compared to the equalized signal. For example, as discussed above, in various implementations a plurality of reference voltages are compared to the equalized signal to generate a plurality of counts. When reference voltages remain to be compared to the equalized signal, the method 500 returns to the operation 515. When no reference voltages remain to be compared to the equalized signal, the method 500 proceeds to operation 535.

At operation 535, a relationship among the counts of comparison results for a plurality of reference voltages is determined. For example, the counts are compared to determine whether hits[neg] or hits[pos], each as described elsewhere herein, is much less than hits[0], also as described elsewhere herein. In at least some examples, the counts are further compared to determine whether hits[neg], hits[pos], and hits[0], are approximately equal to each other.

At operation 540, second equalization is applied to the received signal according to the determined relationship. For example, when hits[neg], hits[pos], and hits[0], are determined to be approximately equal to each other, a conductor over which the signal was received at operation 505 is determined to be a short conductor. When the conductor is determined to be a short conductor, equalization at operation 540 remains unchanged as equalization for a short conductor was already applied at operation 510. When hits[neg] or hits[pos] is determined to be much less than hits[0], the conductor over which the signal was received at operation 505 is determined to be a long conductor. When the conductor is determined to be a long conductor, at operation 540 predetermined equalization for a long conductor is applied to the received signal to generate an equalized signal. The equalization is performed, in some examples, by the equalizer based on an equalization setting received from the controller.

While the operations of the method 500 have been discussed and labeled with numerical reference, in various examples, the method 500 includes additional operations that are not recited herein. In some examples, any one or more of the operations recited herein include one or more sub-operations. In some examples, any one or more of the operations recited herein is omitted. In some examples, any one or more of the operations recited herein is performed in an order other than that presented herein (e.g., in a reverse order, substantially simultaneously, overlapping, etc.). Each of these alternatives is intended to fall within the scope of the present disclosure.

In the foregoing discussion, the terms "including" and "comprising" are used in an open-ended fashion, and thus should be interpreted to mean "including, but not limited to . . . ." The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

While certain components are described herein as being of a particular process technology (e.g., field effect transistor (FET), metal oxide semiconductor FET (MOSFET), n-type, p-type, etc.), these components may be exchanged for components of other process technologies (e.g., replace FET and/or MOSFET with bi-polar junction transistor (BJT), replace n-type with p-type or vice versa, etc.) and reconfiguring circuits including the replaced components to provide desired functionality at least partially similar to functionality available prior to the component replacement. Components illustrated as resistors, unless otherwise stated, are generally representative of any one or more elements coupled in series and/or parallel to provide an amount of impedance represented by the illustrated resistor. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about", "approximately", or "substantially" preceding a value means +/−10 percent of the stated value.

The above discussion is meant to be illustrative of the principles and various examples of the present disclosure. Numerous variations and modifications will become apparent to those skilled in the art once the above disclosure is fully appreciated. It is intended that the present disclosure be interpreted to embrace all such variations and modifications.

What is claimed is:

1. A circuit, comprising:
an equalizer comprising an input terminal configured to receive a data signal and an output terminal, wherein the equalizer is configured to receive an equalizer setting and generate an equalized signal according to the data signal and the equalizer setting;
a comparator comprising a first input terminal coupled to the output terminal of the equalizer, a second input terminal configured to receive a plurality of threshold signals, and an output terminal at which the comparator is configured to output a comparison result indicating a result of a comparison between the equalized signal and a respective threshold signal of the plurality of threshold signals under current consideration;
a counter comprising an input terminal and an output terminal and being configured to count a number of rising edges of the comparison result; and
a controller comprising an input terminal coupled to the output terminal of the comparator and an output terminal coupled to a control input of the equalizer, wherein the controller is configured to:
control the equalizer to apply a short conductor equalizer setting;
determine a relationship among counts output by the counter for multiple of the plurality of threshold signals; and
control the equalizer to remain at the short conductor equalizer setting or control the equalizer to apply a long conductor equalizer setting based on the determined relationship.

2. The circuit of claim 1, further comprising a divider coupled between the output terminal of the comparator and the input terminal of the counter, wherein the divider is configured to divide a frequency of the comparison result prior to counting of the rising edges of the comparison result by the counter.

3. The circuit of claim 1, further comprising a digital-to-analog converter (DAC) having an input terminal coupled to a second output terminal of the controller and an output terminal coupled to the second input terminal of the comparator, wherein the DAC is configured to receive a plurality of threshold values from the controller and generate the plurality of threshold signals based on the plurality of threshold values.

4. The circuit of claim 1, wherein determining the relationship among the counts output by the counter comprises determining that a conductor over which the data signal is received is a short conductor when at least three counts output by the counter and corresponding to three separate threshold signals of the plurality of threshold signals are approximately equal in value.

5. The circuit of claim 1, wherein determining the relationship among the counts output by the counter comprises determining that a conductor over which the data signal is received is a long conductor when at a first count output by the counter corresponding to a first of three separate threshold signals of the plurality of threshold signals or a second count output by the counter corresponding to a second of the three separate threshold signals has a value outside a predetermined allowable variance from a value of a third count output by the counter corresponding to a third of the three separate threshold signals.

6. The circuit of claim 5, wherein the first of the three separate threshold signals varies from the third of the three separate threshold signals by X units, and wherein the second of the three separate threshold signals varies from the third of the three threshold signals by X+1 units, X is a non-zero positive integer.

7. The circuit of claim 5, wherein controlling the equalizer to apply the short equalizer setting or the long equalizer setting is performed without performing clock data recovery on the data signal.

8. A system, comprising:
a processor;
a non-transitory memory; and
an equalization adaptation computer program product stored in the non-transitory memory that, when executed by the processor, causes the processor to:
control an equalizer to apply first equalization to a received data signal to generate an equalized signal;

control a digital-to-analog converter (DAC) to output a plurality of threshold signals for comparison to the equalized signal;
determine a count of rising edges in a comparison result of the comparison of the equalized signal to the threshold signal for a predetermined period of time for each of the plurality of threshold signals;
determine a relationship among multiple of the determined counts of rising edges; and
control the equalizer to apply second equalization to the received data signal according to the determined relationship;
wherein the processor is further configured to determine the relationship among multiple of the determined counts of rising edges by determining that a conductor over which the data signal is received is a short conductor when at least three of the determined counts of rising edges, each of which uniquely corresponding to one of three separate threshold signals of the plurality of threshold signals, are approximately equal in value.

9. The system of claim 8, wherein the first equalization is equalization for the short conductor and controlling the equalizer to apply second equalization to the received data signal according to the determined relationship comprises controlling the equalizer to apply equalization for a long conductor.

10. A system, comprising:
a processor;
a non-transitory memory; and
an equalization adaptation computer program product stored in the non-transitory memory that, when executed by the processor, causes the processor to:
control an equalizer to apply first equalization to a received data signal to generate an equalized signal;
control a digital-to-analog converter (DAC) to output a plurality of threshold signals for comparison to the equalized signal;
determine a count of rising edges in a comparison result of the comparison of the equalized signal to the threshold signal for a predetermined period of time for each of the plurality of threshold signals;
determine a relationship among multiple of the determined counts of rising edges; and
control the equalizer to apply second equalization to the received data signal according to the determined relationship;
wherein the processor is further configured to determine the relationship among multiple of the determined counts of rising edges by determining that a conductor over which the data signal is received is a long conductor when a first of the determined counts of rising edges, corresponding to a first of three separate threshold signals of the plurality of threshold signals, or a second of the determined counts of rising edges, corresponding to a second of the three separate threshold signals, has a value outside a predetermined allowable variance from a value of a third of the determined counts of rising edges, corresponding to a third of the three separate threshold signals.

11. The system of claim 10, wherein the first of the three separate threshold signals varies from the third of the three separate threshold signals by X units, and wherein the second of the three separate threshold signals varies from the third of the three threshold signals by X+1 units, X is a non-zero positive integer.

12. The system of claim 10, wherein the first equalization is equalization for a short conductor and controlling the equalizer to apply second equalization to the received data signal according to the determined relationship comprises maintaining the equalization for the short conductor unchanged.

13. A method, comprising:
applying first equalization to a received data signal to generate an equalized signal;
comparing the equalized signal to each of a plurality of reference voltages for a predetermined period of time per respective reference voltage to generate a comparison result;
determining a plurality of counts with each count of the plurality of counts uniquely corresponding to a number of rising edges in the comparison result for each of the plurality of reference voltages;
comparing at least one of the plurality of counts to at least another of the plurality of counts to determine a relationship among the plurality of counts; and
applying second equalization to the received data signal based on the determined relationship among the plurality of counts; and
determining the relationship among multiple of the plurality of counts by determining that a conductor over which the data signal is received is a short conductor when at least three of the plurality of counts, each of which uniquely corresponding to one of three separate reference voltages of the plurality of reference voltages, are approximately equal in value.

14. The method of claim 13, wherein the first equalization is equalization for the short conductor and applying the second equalization to the received data signal comprises applying equalization for a long conductor.

15. A method, comprising:
applying first equalization to a received data signal to generate an equalized signal;
comparing the equalized signal to each of a plurality of reference voltages for a predetermined period of time per respective reference voltage to generate a comparison result;
determining a plurality of counts with each count of the plurality of counts uniquely corresponding to a number of rising edges in the comparison result for each of the plurality of reference voltages;
comparing at least one of the plurality of counts to at least another of the plurality of counts to determine a relationship among the plurality of counts; and
applying second equalization to the received data signal based on the determined relationship among the plurality of counts; and
determining the relationship among multiple of the plurality of counts by determining that a conductor over which the data signal is received is a long conductor when a first of the plurality of counts, corresponding to a first of three separate reference voltages of the plurality of reference voltages, or a second of the plurality of counts, corresponding to a second of the three separate reference voltages, has a value outside a predetermined allowable variance from a value of a third of the plurality of counts, corresponding to a third of the three separate reference voltages.

16. The method of claim 15, wherein the first equalization is equalization for a short conductor and applying the second equalization comprises maintaining the equalization for the short conductor unchanged.

17. The method of claim 15, wherein the first of the three separate reference voltages varies from the third of the three separate reference voltages by X units, and wherein the second of the three separate reference voltages varies from the third of the three separate reference voltages by X+1 units, X is a non-zero positive integer.

\* \* \* \* \*